United States Patent [19]

Hsu

[11] Patent Number: 4,904,910
[45] Date of Patent: Feb. 27, 1990

[54] AUTOMATIC DELAY-CONTROLLING DEVICE

[76] Inventor: Yan-Wen Hsu, 4 Fl., No. 25-3, Lane 179, Sec. 2, Nei Hu Rd., Taipei, Taiwan

[21] Appl. No.: 309,371

[22] Filed: Feb. 13, 1989

[51] Int. Cl.$^4$ .......................................... H01H 43/00
[52] U.S. Cl. .................................. 318/445; 318/484; 307/141
[58] Field of Search ............... 318/445, 446, 447, 484; 307/141, 141.4, 141.8; 315/360; 340/309.15, 309.6; 364/569; 368/155

[56] References Cited

U.S. PATENT DOCUMENTS

| | | | |
|---|---|---|---|
| 4,379,237 | 4/1983 | Mosteller, Jr. | 307/141 |
| 4,480,195 | 10/1984 | Sawaki et al. | 307/141.4 X |
| 4,570,216 | 2/1986 | Chan | 307/141 X |
| 4,668,878 | 5/1987 | Wyss | 307/141 |
| 4,851,708 | 7/1989 | Palmer | 307/141 |

Primary Examiner—Bentsu Ro
Attorney, Agent, or Firm—Kolisch, Hartwell & Dickinson

[57] ABSTRACT

An automatic delay-controlling device for pre-setting a delay of the switching-on or switching-off of loads such as general motors, lighting apparatuses, etc., having a controller, a central processing unit, a read only memory, an address multiplexer, a programmable peripheral interface, an ouput driver and an alternating-current power supply connected to the output driver via a load. The controller is connected to the central processing unit and has three buttons serving as inputs to the central processing unit for inputting the duration of the delay. The central processing unit, read only memory, address multiplexer and programmable peripheral interface are intercommunicated to co-process signals from the controller in order to control the operation of the output driver. Therefore, the output driver is controlled to carry or not carry the load with the aid of the alternating-current power supply.

4 Claims, 3 Drawing Sheets

AUTOMATIC DELAY-CONTROLLING DEVICE

BACKGROUND OF THE INVENTION

The present invention relates to an automatic delay-controlling device for pre-setting a delay of the switching-on or switching-off of motors, lighting apparatuses, or the like. More particularly, the present invention relates to an automatic delay-controlling device in which a central processing unit (CPU) is provided with a keyboard for pre-setting the delay of the switching-on or switching-off of motors, the luminous intensity of lighting apparatuses, or the like.

Heretofore, many kinds of delay-controlling devices utilizing a TRIAC 81 coupled with a DIAC 82 and an RC circuit comprising a resistor 83 and a capacitor 84 are developed to control the switching-on or switching-off, as shown in FIG. 3. In such a conventional device, the variable resistor 83 is employed to adjust the triggering times for the proceeding step of prosecution. However, due to the characteristics of resistors and capacitors, the employment of such elements as delay components does not guarantee a high accuracy. Furthermore, since the adjustment of delay time of the conventional devices are manually operated, the delay time cannot be determined automatically in advance.

It is the purpose of the present invention, therefore, to mitigate and/or obviate the above-mentioned drawbacks in the manner set forth in the detailed description of the preferred embodiment.

SUMMARY OF THE INVENTION

A primary object of the present invention is to provide an automatic delay-controlling device for motors, lighting apparatuses, or the like, in which a key board is provided to pre-set a delay of the switching-on or switching-off.

Another objective of the present invention is to provide an automatic delay-controlling device, in which all the elements are exclusively electronic and no mechanical device is involved in controlling the operation thereof.

Further objects and advantages of the present invention will become apparent as the following description proceeds, and the novel features which characterize the invention will be pointed out with particularity in the claim annexed to and forming a part of this invention.

DETAILED DESCRIPTION OF THE PREFERRED EMBODIMENT

Figure 1:
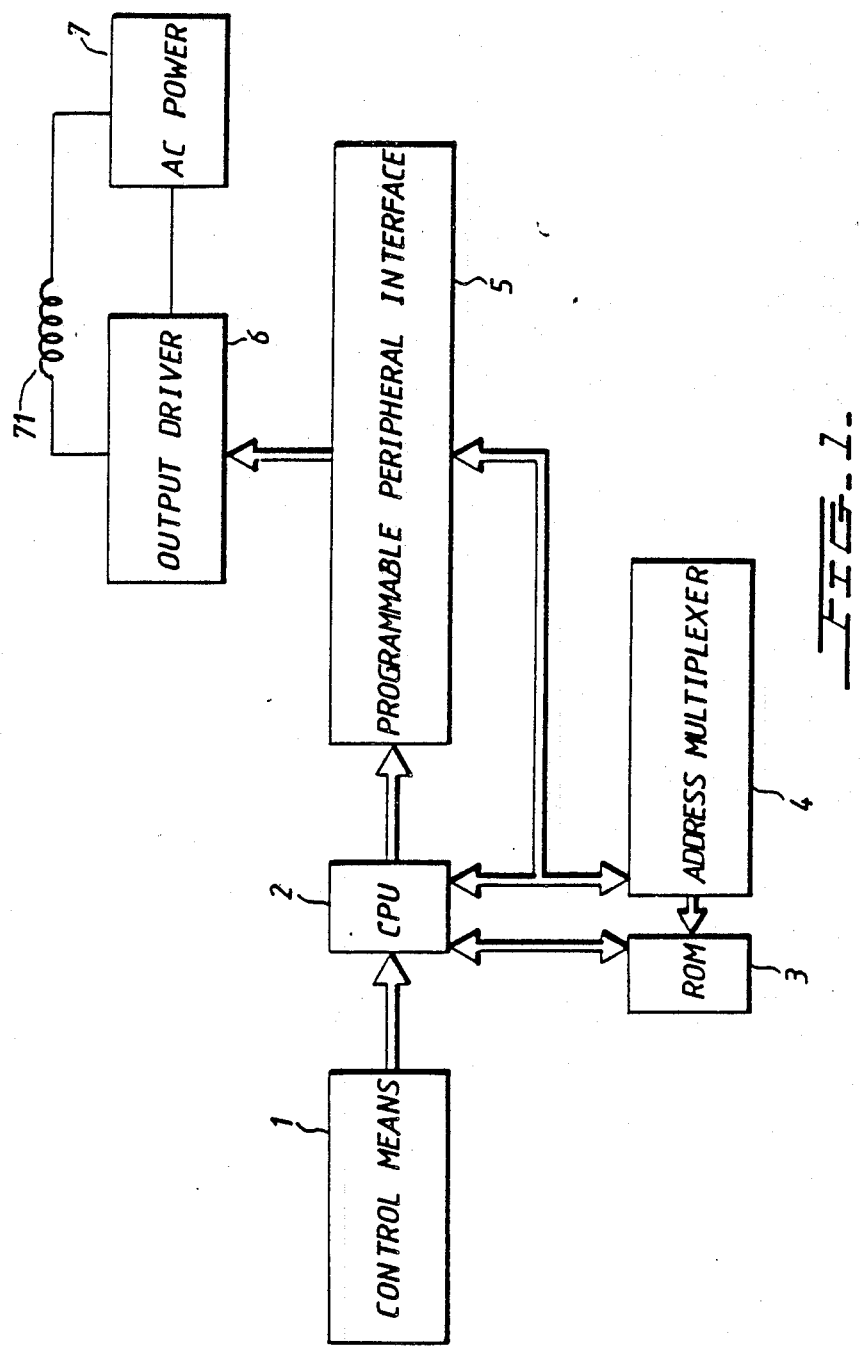
FIG. 1 is a functional block diagram of an automatic delay-controlling device in accordance with the present invention.

With reference to the drawings and particularly to FIG. 1 thereof, it can be seen that an automatic delay-controlling device in accordance with the present invention comprises a control means 1, a central processing unit (CPU) 2, a read only memory (ROM) 3, an address multiplexer 4, a programmable peripheral interface 5 and an output driver 6 connected to the programmable peripheral interface 5 and receiving a signal therefrom. The output driver 6 is further coupled to an alternative-current power supply 7 via a load 71. Thus, if the output driver 6 is triggered, the loop of the load is closed and the power supply 7 energizes the load 71. As is common in conventional computer architecture, the CPU 2 is communicated with the ROM 3, address multiplexer 4 and programmable peripheral interface 5. Since the construction of and the intercommunication among the CPU 2, ROM 3, address multiplexer 4 and programmable peripheral interface 5 are well-known in the art, further discussion and description are not necessary.

The control means 1 comprises a plurality of buttons, namely a setting button, a delay-on button and a delay-off button, which are electrically connected to the CPU 2 and serve as the inputs thereof. When a signal from the control means 1 is received by the CPU 2, the input signal is co-processed by the CPU 2, ROM 3 and address multiplexer 4 in a known manner and is output from the programmable peripheral interface 5 to control the operation of the output driver 6. The setting button is used to tell the CPU 2 that a delay time is to set or the setting procedure is ended to prevent the CPU 2 from false actions. The delay-on button is used to set the duration of delay time for switching-on, and the delay-off button is used to set the duration of delay time for switching-off.

The pre-setting procedure of the delay time includes the following steps:

1. Push the setting button once to tell the CPU 2 that a delay is to be set;
2. Push the delay-on/delay-off button n times depending on the desired duration; and
3. Finally push the setting button once again to indicate that the setting of delay time is finished.

Each push on the delay-on/delay-off button represents the pre-setting of a delay unit. For example, if the delay-on button is pushed three times, then after a duration of three delay units (for example, a total delay of fifteen minutes is obtained if one delay unit corresponds to a delay of five minutes), the output driver 6 will be actuated. Likewise, the operation of the delay-off button is similar to that of the delay-on button. If the delay-off button is pushed three times, the switch-off will be delayed by fifteen minutes. It should be noted that the pre-set delay can only be effected, when the setting button is pushed before and after the pushing of the delay-on/delay-off button. If the user forgets to push the setting button before or after the setting of the delay-on/delay-off button, the desired delay cannot be obtained, since the input of the desired delayed duration is not successfully entered into the CPU 2.

Figure 2:
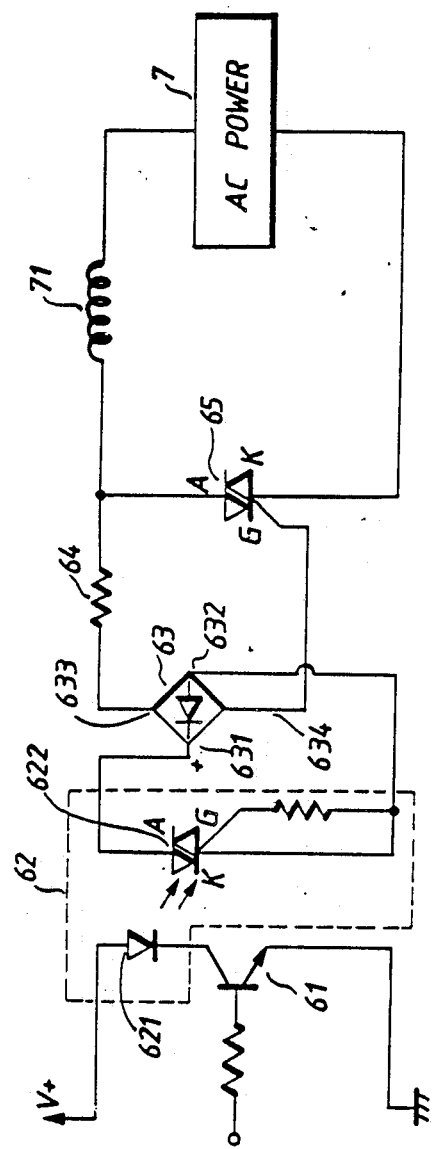
FIG. 2 is a schematic diagram of a preferred embodiment of the output driver employed in FIG. 1.
Figure 3:
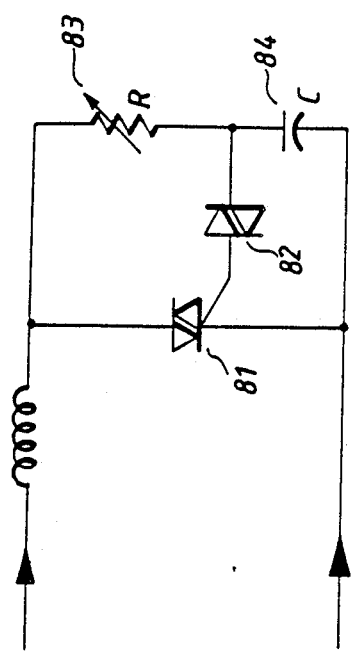
FIG. 3 is a circuit diagram of a conventional delay controlling device.

Referring to FIG. 2, the output driver 6 comprises a transistor 61, an optical coupler 62 shown in dotted lines, a bridge surface 63, a resistor 64 and a TRIAC 65. The base of the transistor 61 is connected to the output of the programmable peripheral interface 5, and the collector of the transistor 61 is connected to a light emitting diode (LED) 621 to trigger the optical coupler 62. Besides the LED 621, the optical coupler 62 further comprises a thyristor, for example, an optical TRIAC 622, the input and output of which are respectively connected to the input and output of the first branch 631 and 632 of the bridge rectifier 63. The input and output of the second branch 633 and 634 of the bridge rectifier 63 are respectively connected to the gate and the anode A of the TRIAC 65 with the resistor 64 coupling to the anode A of the TRIAC 65, the anode A and cathode K of which are respectively coupled to the alternating current power supply 7 via the load 71. It is appreciated that if the very instance in which the system is to be switched on is reached, a signal from the programmable peripheral interface 5 is sent to the base of the transistor 61 to actuate the LED 621. The triggering of the optical coupler 62 causes the TRIAC 65 to be conducted via the bridge rectifier 63, so an electric current flow through the load 71 (i.e., to carry the load 71).

It should be noted that according to the present invention, the output driver 6 linearly elevates the load 71 from zero to full value during the duration of delay time for turning the switch on, when the delay-on button is pushed. Similarly, the output driver 6 linearly reduces the load 71 from full value to zero during the duration of delay time for turning the switch off. This benefits the operation of the motor and extends its life span, and provides a preparatory time for some machine where a preheating is required.

While the invention has been explained in relation to its preferred embodiment, it is to be understood that various modifications thereof will become apparent to those skilled in the art upon reading this specification. Therefore, it is to be understood that the invention disclosed herein is intended to cover such modifications as fall within the scope of the appended claims.

I claim:

1. An automatic delay-controlling device for pre-setting a delay of the switching-on and switching-off of a load, said automatic delay-controlling device comprising a control means, a central processing unit, a read only memory, an address multiplexer, a programmable peripheral interface, an output driver and an alternating-current power supply connected to said output driver through said load;

said control means comprising a plurality of buttons electrically connected to said central processing unit and serving as inputs thereof;

said central processing unit, read only memory, address multiplexer and programmable peripheral interface being intercommunicated to co-process signals from said control means to control the operation of said output driver; and said output driver comprising a transistor, an optical coupler, a bridge rectifier, a resistor and a TRIAC; the base of said transistor being connected to an output of said programmable peripheral interface; the actuation of said transistor causing said optical coupler to conduct, and via said bridge rectifier and said TRIAC, to control said load.

2. An automatic delay-controlling device as set forth in claim 1, wherein said control means comprises a setting button, an delay-on button and a delay-off button.

3. An automatic delay-controlling device as set forth in claim 1, wherein said optical coupler comprises a light emitting diode and a thyristor.

4. An automatic delay-controlling device as set forth in claim 1, wherein said load is a motor.

* * * * *